United States Patent [19]
Murtojärvi

[11] Patent Number: 5,999,523
[45] Date of Patent: Dec. 7, 1999

[54] RADIOTELEPHONE OPERATING IN A TIME-DIVIDED RADIOTELEPHONE SYSTEM

[75] Inventor: Simo Murtojärvi, Salo, Finland

[73] Assignee: Nokia Mobile Phones, Ltd., Salo, Finland

[21] Appl. No.: 08/711,183

[22] Filed: Aug. 27, 1996

[30] Foreign Application Priority Data

Sep. 22, 1995 [FI] Finland .................................. 954513

[51] Int. Cl.⁶ .................................................. H04J 3/02
[52] U.S. Cl. ................................................ 370/345; 455/83
[58] Field of Search .................................. 455/83, 76, 78; 370/276, 282, 294, 345, 321, 337, 347

[56] References Cited

U.S. PATENT DOCUMENTS

| | | | |
|---|---|---|---|
| 3,584,301 | 6/1971 | Tomaszewski | 455/83 |
| 4,055,807 | 10/1977 | Priniski et al. | 455/83 |
| 5,091,919 | 2/1992 | Kuisma | 375/60 |
| 5,123,031 | 6/1992 | Kuisma | 375/60 |
| 5,160,900 | 11/1992 | Visuri | 331/18 |
| 5,193,218 | 3/1993 | Shimo | 455/83 |
| 5,291,474 | 3/1994 | Ikonen et al. | 370/30 |
| 5,301,387 | 4/1994 | Heinonen | 455/76 |
| 5,319,800 | 6/1994 | Erbora et al. | 455/83 |
| 5,521,561 | 5/1996 | Yrjola et al. | 455/83 |
| 5,548,239 | 8/1996 | Kohama | 455/83 |
| 5,678,199 | 10/1997 | Birta et al. | 455/83 |

FOREIGN PATENT DOCUMENTS 0 441 500 A3  8/1991  European Pat. Off. .
0 446 050 A3  9/1991  European Pat. Off. .

*Primary Examiner*—Huy D. Vu
*Attorney, Agent, or Firm*—Perman & Green, LLP

[57] ABSTRACT

The radiotelephone of a time-divided radiotelephone system, i.e. TDMA, has a first mode and a second mode, whereby in the first mode the transmitter (TX) is active and in the second mode the receiver (RX) is active. When the transmitter is on, the TX signal dependent on it controls switching means (V2) in such a way that in the first mode blocking is accomplished of at least one active signal path that is in the other mode. In this way the isolation between the transmitter and the receiver is improved. The switching means can comprise, for example, a transistor (V2), by means of which the collector of the transistor (V1) of the RX amplifier is connected substantially to the earth potential.

18 Claims, 4 Drawing Sheets

RADIOTELEPHONE OPERATING IN A TIME-DIVIDED RADIOTELEPHONE SYSTEM

BACKGROUND OF THE INVENTION

The present invention relates to a radiotelephone operating in a time-divided radiotelephone system, which telephone has at least a first mode and a second mode, whereby in the first mode the transmitter is active and in the second mode the receiver is active.

In TDMA, i.e. time-divided radiotelephone systems, the transmitter and receiver are on at different times. Accordingly, connecting the transmitter and receiver to the antenna can be done either with synchronized switches (PIN diode, GaAs-fet switch, or the like) or with a duplex filter that is familiar from analog telephone applications. A typical block diagram using a duplex filter is shown in FIG. 1.

To reduce power consumption and block leakage of the TX-frequency signal to the RX branch, the receiver's electric power (VRX) is switched off when the transmitter (TX) is on. In this case, at the antenna port of the duplex filter there is a signal level that is of the order of +30 dBm at its greatest, in other words, when the transmitter is using the highest power level.

The isolation from the transmitter to the input of the receiver may be less than 20 dB at its poorest (1800 MHz, i.e. in the PCN range), in which case during transmission a still quite strong signal (>10 dBm) is connected to the receiver (RXamp). Although the receiver stage does not carry a supply voltage during transmission, the transmitter signal leaks through it. In addition, the signal is not attenuated very much in the RX filter (RXfil), because the highest transmission frequency is only 20 MHz away from the lowest reception frequency and the reception band is all of 75 MHz wide. When the transmission signal reaches the RX mixer with a sufficient intensity, it causes a frequency pulling of the local oscillator (VCO), which shows up in the transmitted signal as a phase error because the same oscillator is used to form the transmission frequency. To minimize this effect, buffering can be added in between the oscillator and the RX mixer or the isolation from the transmitter to the receiver can be improved. Improving the isolation by tightening the duplex filter nevertheless increases the price of the filter and the attenuation on the upper channels of the transmitter.

The above-described leakage problem also hampers systems operating in a lower frequency than PCN range, though it is somewhat less pronounced.

A well known means of remedying the problem discussed is thus to use a better duplex filter whose RX branch attenuates the TX frequency signal more. This nevertheless complicates the structure of the filter, and makes it bigger and more costly. Another problem is that now attenuation of the duplex filter for TX frequency signals increases, in this case on the upper channels. Thus, the transmitter power going to the antenna tends to diminish on the upper channels, and it has to be compensated by increasing the power obtainable from the transmitter, which on the other hand increases the current consumption.

Another well known way is to add a buffer amplifier in between the RX mixer and the VCO. This reduces the leakage from the RX mixer to the VCO. In order for the buffer amplifier to work in the desired manner, it must of course be active, and this increases current consumption.

Some telephone manufacturers use in place of a duplex filter a changeover switch which serves to select the signal path TX-amp . . . >ANT during transmission and ANT . . . >RX-amp during reception. These switches too cause signal leakage at high frequencies.

The leakage of a quite strong transmission signal into the telephone's other blocks causes problems similar to those in a VCO. A problem point is, for example, at least the integrated circuits, where it is attempted to integrate both the receiver and transmitter blocks on the same circuit.

SUMMARY OF THE INVENTION

The purpose of the invention is to eliminate the above-discussed problems in a very simple manner, and to accomplish this the invention is characterized in that the radiotelephone comprises switching means by which at least one signal path that is active in the second mode is blocked in the first mode.

The preferred embodiments of the invention are set forth in the dependent claims.

In accordance with the invention, greater isolation is thus obtained by connecting a series switch to the signal path or by shorting the signal to the earth potential at a suitable point.

It should be noted at the outset that a series switch involves certain drawbacks. It increases the loss also in the receiving mode, and accordingly its use on the input of the receiver leads to a poorer noise figure. On the output side, it can be used.

Accordingly, a parallel switch, i.e. shorting a point of the signal path to the earth potential appears to be a better solution.

BRIEF DESCRIPTION OF THE DRAWING

Certain embodiments of the invention as well as their advantages and some drawbacks are discussed in greater detail in the following with reference to the accompanying diagrams in which.

DETAILED DESCRIPTION OF THE INVENTION

Figure 1:
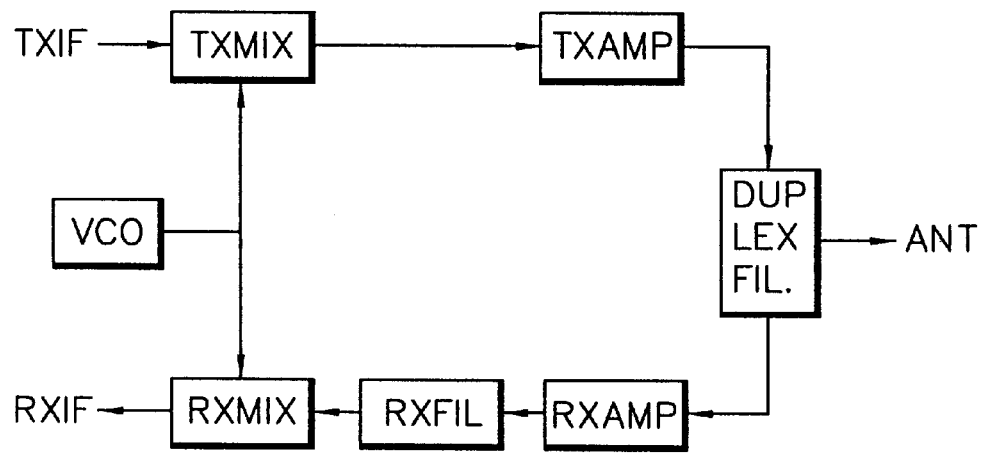
FIG. 1 shows the already discussed prior art.
Figure 2:
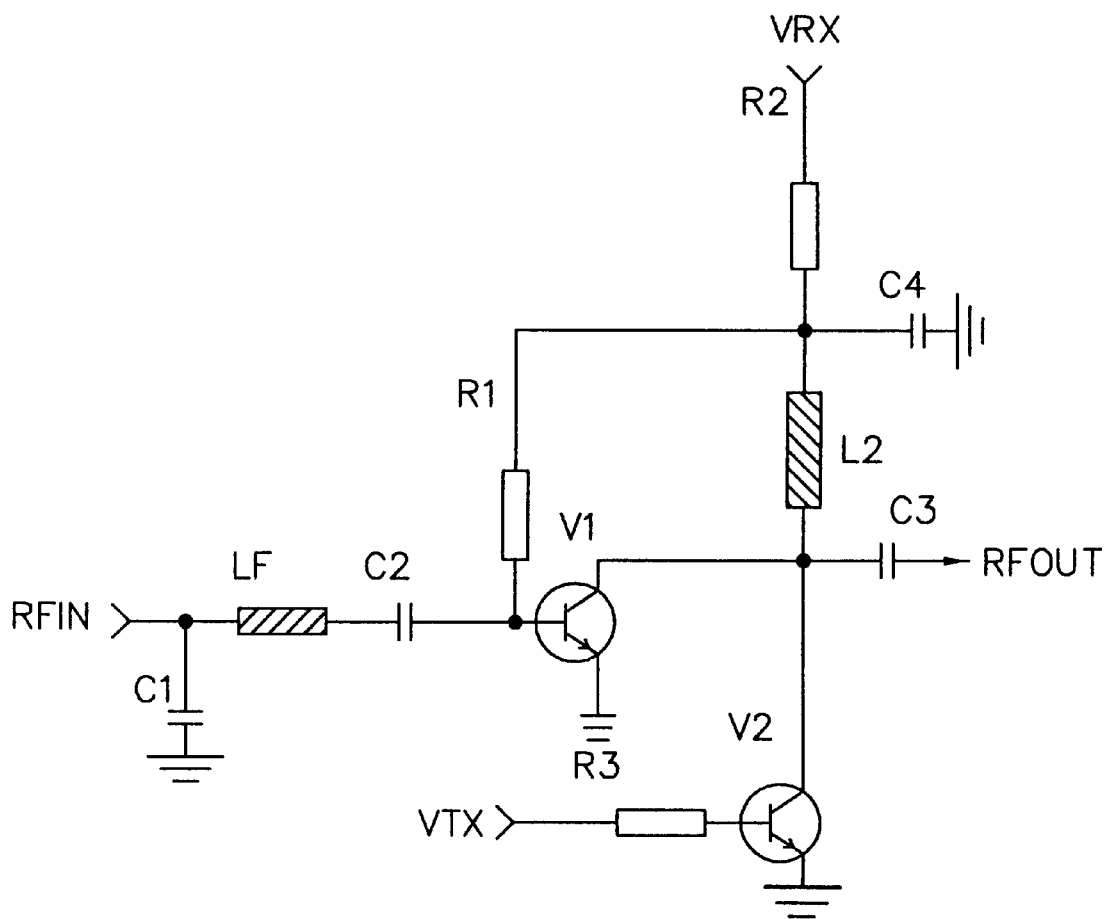
FIG. 2 shows a preferred embodiment of the present invention.

In the circuit arrangement in FIG. 2, transistor V2 is connected to the earth potential from collector V1 of the RX amplifier. During reception, VRX is on and VTX is off. Accordingly, a voltage is applied to the collector of V2, but the base carries no current, so that the transistor does not affect the operation of V1 and does not change the amplification of the stage. During transmission, on the other hand, VRX is off and VTX is on, so that the collector voltage of V2 is 0 V, but a base current flows in the transistor. Transistor V2 is thus in the saturated state. This means that the transistor has a very small ohmic resistance between its collector and emitter, whereby the signal path (V1's collector) is efficiently shorted to the earth potential. The advantage of the circuit arrangement is that the required base current is small (of the order of 0.5 mA) and is applied only during transmission. In addition, the circuit arrangement takes up only a small surface area. The isolation can be improved a bit more by adding a suitable capacitor from the base of V2 to the earth potential.

Here, then, V2 and R3 belong to the switch that handles the short circuiting of the RX signal path to the earth potential when TX is on, and the other components belong to the RX amplifier (RX-amp). During reception, a DC voltage is applied to the collector of V2, and this is an essential point for the operation of the switch. During reception, the base-collector diode of transistor V2 is reverse-biased, and the switch circuit does not distort the signal even at high RX signal levels. During transmission, however, a voltage is not applied to the collector of V2, voltage not being needed for operation of the switch, and at the same time current is saved because DC current does not flow between the collector and emitter of V2. No kind of own biasing is needed for the switching transistor V2.

Figure 3:
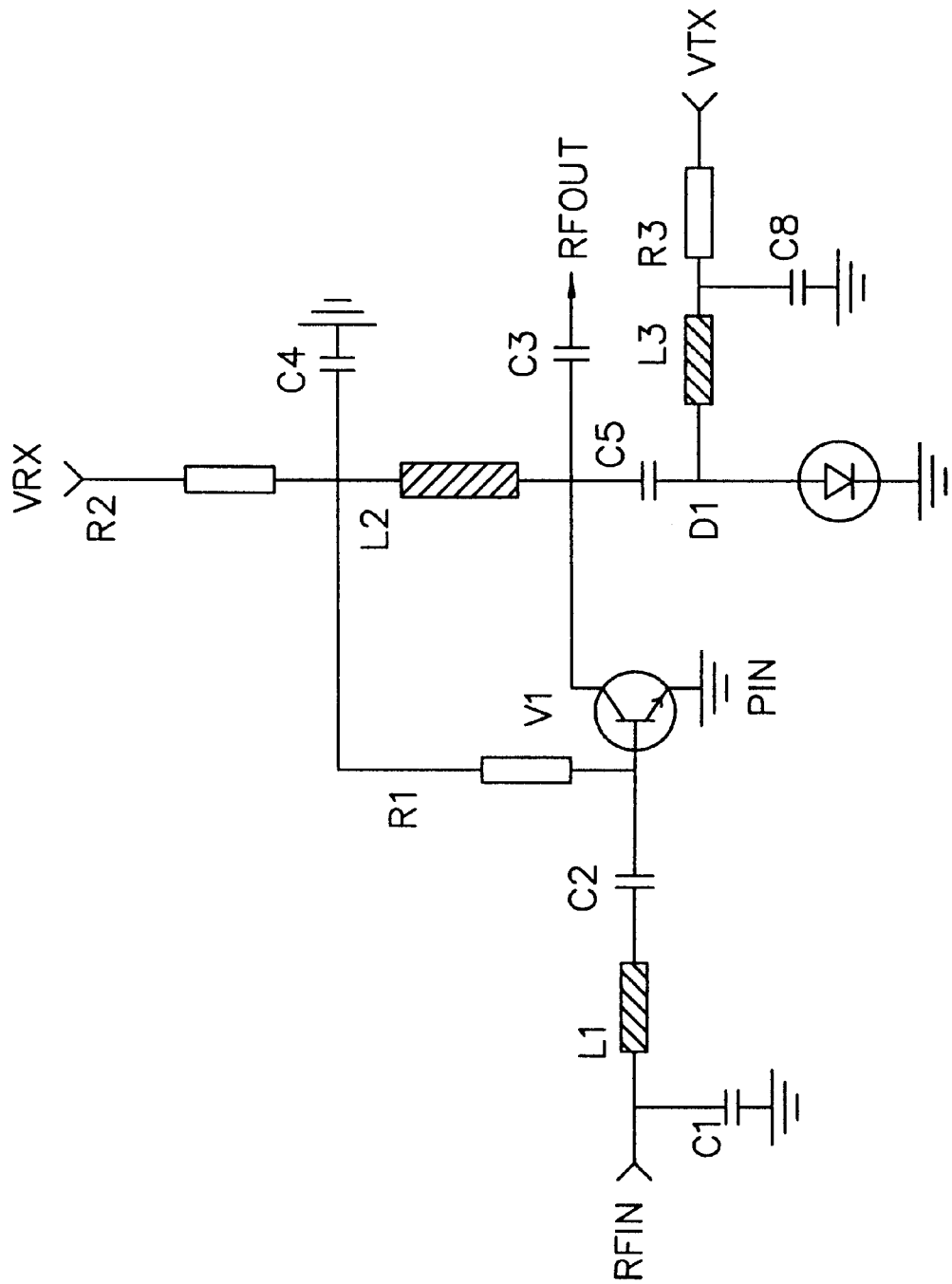
FIGS. 3–7 show some alternative embodiments of the invention.

In the circuit arrangement in FIG. 3, choke L3 (a transmission line or coil) has a high impedance at the frequency to be short circuited which means that it does not attenuate the signal during reception. When current is run through the diode during transmission, the impedance of the diode is small and any RF signal at the collector of V1 is short-circuited via C5 and D1. C5 can be dimensioned in such a way that its resistance cancels out the inductive reactance of the diode, whereby the reactance of the diode determines the improvement that can be obtained in the isolation. When using a PIN diode, the diode current must be set to a fairly high value to make the resistance small enough. Accordingly, the standby time of the telephone is shortened. In addition, biasing the diode calls for matching strips or chokes, as is shown in the figure.

On the other hand, use of, say, a GaAs fet switch would lead to considerable expense.

Figure 4:
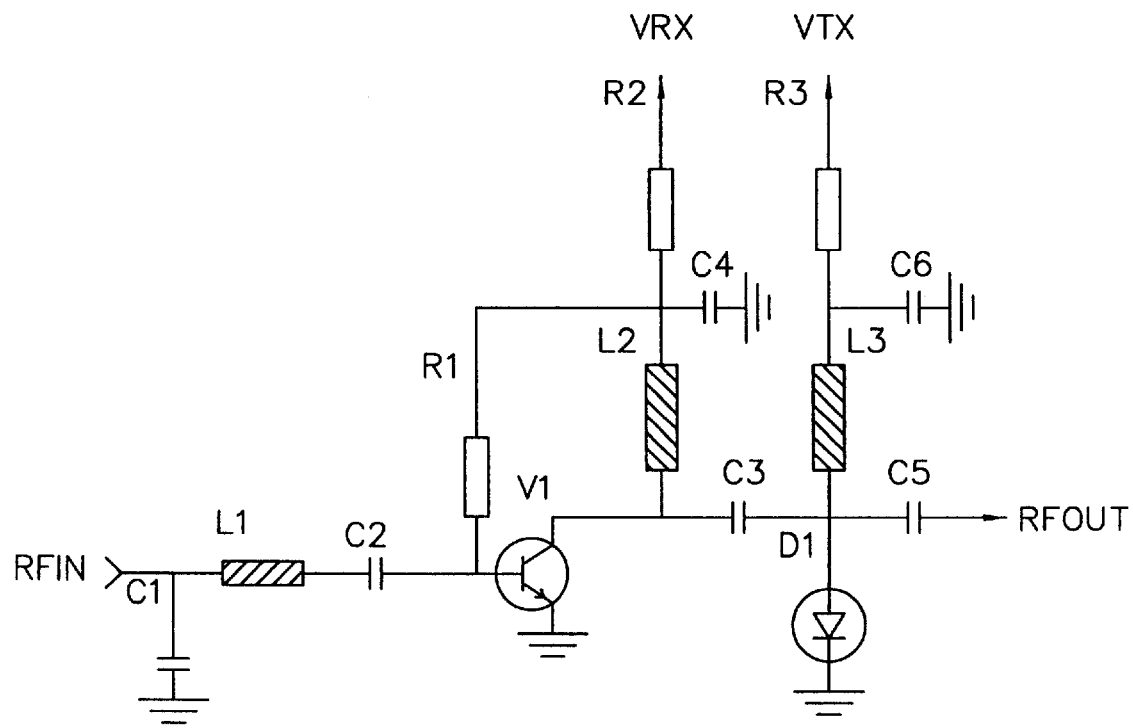

FIG. 4 shows an alternative location for the diode. The operation is in other respects the same as in FIG. 3.

Figure 5:
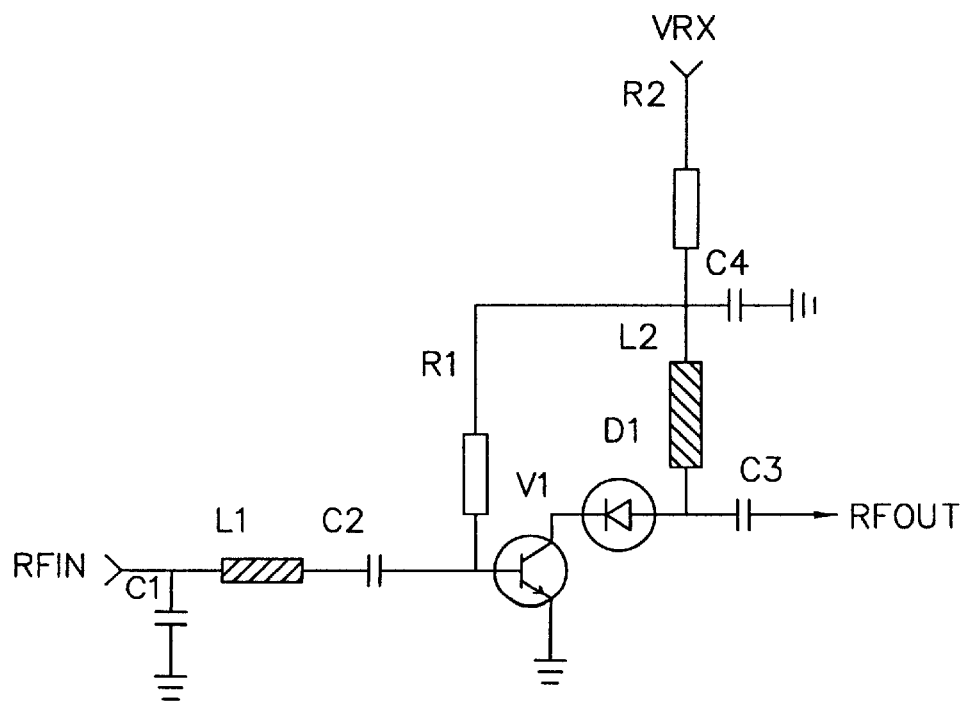

FIG. 5 shows a simple series connection of a diode to an RF signal path. The improvement in isolation depends on the capacitance of the diode, which should be very small when the diode does not carry a current. Reducing the amplification of the RF stage in turn depends on the resistance of the diode when it is in the conducting state (VRX is on). The resistance of the diode must be small. In general, with a PIN diode whose resistance goes low, the capacitance is greater, which means that in selecting a diode a compromise must be sought between resistance and capacitance. This circuit arrangement is still usable at GSM (less than 1 GHz) frequencies.

Figure 6:
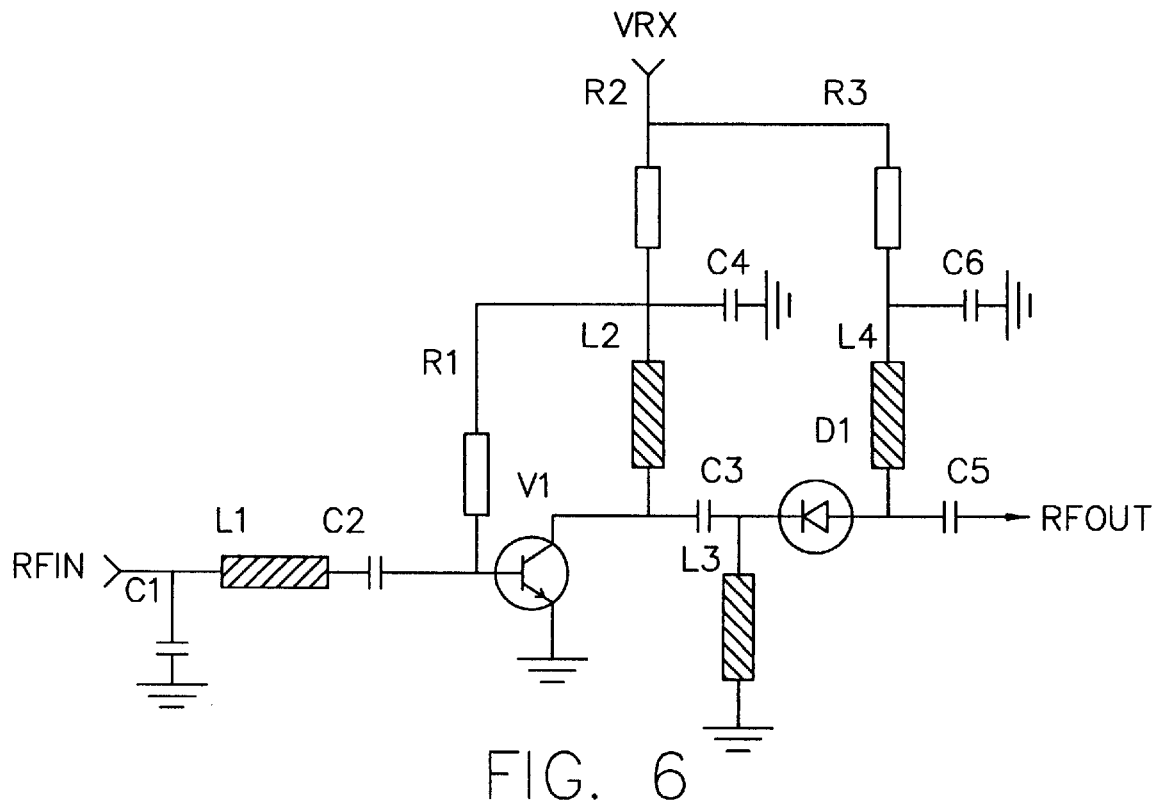

In FIG. 6 a PIN diode is connected to a point where the effect of the diode's resistance on the amplification is smaller (the diode is in series with a transmission line of about 50 ohms). The number of components needed for the circuit arrangement is nevertheless large, thus imposing a larger space requirement. Similarly, the isolation depends on the diode's capacitance as in the previous circuit arrangement. The current requirement of the circuit arrangement is also larger than in the above.

Figure 7:
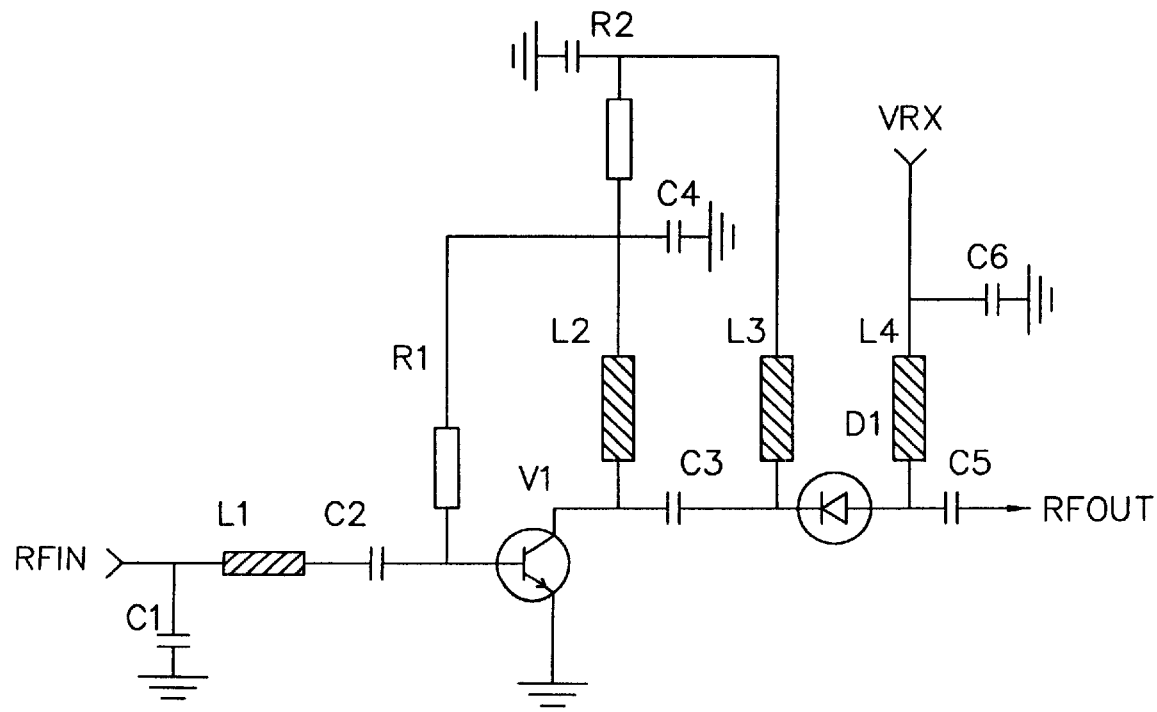

Finally, FIG. 7 shows the same circuit arrangement as above, but the diode's current is lead through the amplifier, whereby the circuit arrangement does not increase the current consumption. The isolation and effect on the amplification are the same as in the above.

It should be noted, that the switching means according to the invention are separate from any prior art antenna changeover switching means such as described previously, if such antenna changeover switching means are included in a system utilizing the invention. One advantage of the present invention is, that it is easier and more economical to use additional switching means according to the invention than to improve the characteristics of an antenna changeover switch, to reach a certain desired attenuation level.

I claim:

1. A radiotelephone operating in a time-divided radiotelephone system, which telephone has at least a first mode and a second mode, whereby in the first mode a transmitter (TX) of the radiotelephone is active and in the second mode a receiver (RX) of the radiotelephone is active and in which, for selection of the signal path from an antenna to the receiver (RX) and from the transmitter (TX) to the antenna of the radiotelephone, a filter of the duplex type or synchronized switching means are used, wherein the radiotelephone additionally comprises selective switching means serving as a blocking element by which at least one signal path that is active in the second mode is blocked in the first mode upon the presence of a transmitted signal at a receiving circuit of the radiotelephone, wherein the transmitted signal is generated by the radiotelephone, and wherein the signal path which is active in the second mode includes a stage of amplification disposed between the antenna and the blocking element.

2. A radiotelephone according to claim 1, wherein the selective switching means comprises series switching means by which the signal path is shorted to ground.

3. A radiotelephone according to claim 1, wherein the signal path to be blocked is an RX branch of a receiver block of the radiotelephone.

4. A radiotelephone according to claim 1, wherein the radiotelephone includes a local oscillator, and the signal path to be blocked is between the RX branch of the radiotelephone and the local oscillator.

5. A radiotelephone operating in a time-divided radiotelephone system, which telephone has at least a first mode and a second mode, whereby in the first mode a transmitter (TX) of the radiotelephone is active and in the second mode a receiver (RX) of the radiotelephone is active and in which, for selection of the signal path from an antenna to the receiver (RX) and from the transmitter (TX) to the antenna of the radiotelephone, a filter of the duplex type or synchronized switching means are used, wherein the radiotelephone additionally comprises selective switching means serving as a blocking element by which at least one signal path that is active in the second mode is blocked in the first mode, wherein a blocking of the signal path is arranged by means of the RX amplifier of a receiver branch of the radiotelephone, and wherein the signal path which is active in the second mode includes a stage of amplification disposed between the antenna and the blocking element.

6. A radiotelephone according to claim 5, wherein the selective switching means is adapted to connect a point of the RX amplifier to ground, which point has a moderately high impedance at rf frequencies.

7. A radiotelephone according to claim 6, wherein the selective switching means comprises a further transistor by means of which the collector of the transistor of the RX amplifier is connected substantially to ground.

8. A radiotelephone according to claim 1, wherein the selective switching means is adapted to be controlled by the telephones VTX signal, which signal corresponds to the on/off state of the transmitter of the radiotelephone.

9. A radiotelephone according to claim 1, wherein the selective switching means comprises series switching means by which the signal path is cut from ground.

10. A radiotelephone according to claim 6, wherein the selective switching means comprises a diode by means of which the collector of the transistor of the RX amplifier is connected substantially to ground.

11. A radiotelephone operating in a time-divided radiotelephone system, which telephone has at least a first mode and a second mode, whereby in the first mode a transmitter (TX) of the radiotelephone is active and in the second mode a receiver (RX) of the radiotelephone is active and in which, for selection of the signal path from an antenna to the receiver (RX) and from the transmitter (TX) to the antenna of the radiotelephone, a filter of the duplex type or synchronized switching means are used, wherein the radiotelephone additionally comprises switching means serving as a blocking element by which at least one signal path that is active in the second mode is blocked in the first mode, wherein a cutting of the signal path is accomplished within the RX amplifier of a receiver branch of the radiotelephone, and wherein the signal path which is active in the second mode includes a stage of amplification within the RX amplifier, the stage of amplification being disposed between the antenna and the blocking element.

12. A radiotelephone operating in a time-divided radiotelephone system, which telephone has at least a first mode and a second mode, whereby in the first mode a transmitter (TX) of the radiotelephone is active and in the second mode a receiver (RX) of the radiotelephone is active and in which signal-path selection means is employed for selection of the signal path from an antenna to the receiver (RX) and from the transmitter (TX) to the antenna of the radiotelephone, wherein the radiotelephone additionally comprises switching means serving as a blocking element by which at least one signal path that is active in the second mode is blocked in the first mode, said switching means being located in an amplifier of a receiver branch of the radiotelephone, and wherein the signal path which is active in the second mode includes a stage of amplification within the amplifier of the receiver branch, the stage of amplification being disposed between the antenna and the blocking element.

13. A radiotelephone according to claim 12, wherein the signal-path selection means comprises a filter of the duplex type.

14. A radiotelephone according to claim 12, wherein the signal-path selection means comprises a synchronized switching means.

15. A radiotelephone according to claim 12, wherein said switching means provides for concurrent deenergization of an RX amplifier and a shorting of an output terminal of the RX amplifier to ground.

16. A radiotelephone operating in a time-divided radiotelephone system, which telephone has at least a first mode and a second mode, whereby in the first mode a transmitter (TX) of the radiotelephone is active and in the second mode a receiver (RX) of the radiotelephone is active and in which, for selection of the signal path from an antenna to the receiver (RX) and from the transmitter (TX) to the antenna of the radiotelephone, a filter of the duplex type or synchronized switching means are used, wherein the radiotelephone additionally comprises selective switching means by which at least one signal path that is active in the second mode is blocked in the first mode upon the presence of a transmitted signal at a receiving circuit of the radiotelephone, wherein the transmitted signal is generated by the radiotelephone; and wherein the selective switching means connects with a terminal of a receiver amplifier of the receiver (RX), the selective switching means including an electrical element providing a current path for a transmitted signal of the transmitter (TX); and wherein an impedance of the electrical element drops in response to flow of current of the transmitted signal to short out the terminal of the receiver amplifier, thereby inhibiting a flow of any leakage of the transmitted signal in the receiver amplifier.

17. A radiotelephone according to claim 16 wherein the electrical element of the switching means comprises a transistor.

18. A radiotelephone according to claim 16 wherein the electrical element of the switching means comprises a diode.

* * * * *